US006629447B1

(12) United States Patent
Collins

(10) Patent No.: US 6,629,447 B1
(45) Date of Patent: Oct. 7, 2003

(54) MACHINE AND PROCESS FOR THE CALIBRATION AND PROVING OF FLOW SENSORS

(76) Inventor: Louis Charles Collins, 3609 Ernest Ct., Ft. Worth, TX (US) 76116

( * ) Notice: Subject to any disclaimer, the term of this patent is extended or adjusted under 35 U.S.C. 154(b) by 0 days.

(21) Appl. No.: 09/981,477

(22) Filed: Oct. 17, 2001

(51) Int. Cl.$^7$ ............................................... G01F 25/00
(52) U.S. Cl. ........................................ 73/1.16; 73/1.19
(58) Field of Search ......................... 73/1.16, 1.19–1.23

(56) References Cited

U.S. PATENT DOCUMENTS

| 2,948,142 A | 8/1960 | Zimmerman, Jr. |
| 2,948,143 A | 8/1960 | Pruitt |
| 3,021,703 A | 2/1962 | Pfrehm |
| 3,120,118 A | 2/1964 | Boyle |
| 3,403,544 A | 10/1968 | Francisco, Jr. |
| 3,580,045 A | 5/1971 | Pfrehm |
| 3,877,287 A | 4/1975 | Duntz |
| 4,152,922 A | 5/1979 | Francisco, Jr. |
| 4,372,147 A | 2/1983 | Waugh et al. |
| RE31,432 E | 11/1983 | Francisco, Jr. |
| 4,475,377 A * | 10/1984 | Halpine ...................... 73/1.16 |
| 4,481,805 A | 11/1984 | Dobesh |
| 4,549,426 A | 10/1985 | Erickson |
| 4,627,267 A | 12/1986 | Cohrs et al. |
| 4,718,267 A | 1/1988 | Capper |
| 4,766,759 A | 8/1988 | Cohrs et al. |
| 4,829,808 A | 5/1989 | West |
| 5,052,211 A | 10/1991 | Cohrs et al. |

* cited by examiner

Primary Examiner—Hezron Williams
Assistant Examiner—Nashmiya Fayyaz

(57) ABSTRACT

A magnetically coupled, small volume, positive displacement, multi-axial, isokinetic, flow sensor calibrator or prover has one or more, serially interconnected flow tubes, through which a cylindrical, convoluted, displacer, with embedded, omni-directional magnet(s), and anti-compression device(s), sequentially, isokenetically dispenses calibration fluid through test flow sensor(s). An oscillating volume detector actuator magnetically coupled to the displacer has concentric, or parallel, outer rings connected to an inner, common center ring, with integral volume detector sensor initiator projection. The volume detector actuator outer ring(s) and center ring oscillate coaxially, respectively, with each flow tube, and a volume detector rod with integral volume detector sensors, sequentially activated by the initiator projection. The apparatus operates in an automatic, unidirectional, closed loop, mode, with the displacer sequentially coupling and decoupling from the oscillating volume detector assembly, while isokinetically dispensing finite increments of a composite volume, during which, the displacer is in continuous transit from, and returning to, the inline launching and receiving station. A P.C./PLC, based operator's monitoring and control station, with calibration software, provides fully automatic operation, monitoring, displaying, alarming, and archiving of data to calculate the performance of the test flow sensor (s), provide dynamic constant velocity, and seal integrity monitoring.

8 Claims, 7 Drawing Sheets

PLAN VIEW - UNI-DIRECTIONAL
TWO (2) TUBE VERSION

SECTION "A-A" - (FIG. 1) - TWO TUBE VERSION (SHOWN WITHOUT FRAME SUPPORT)

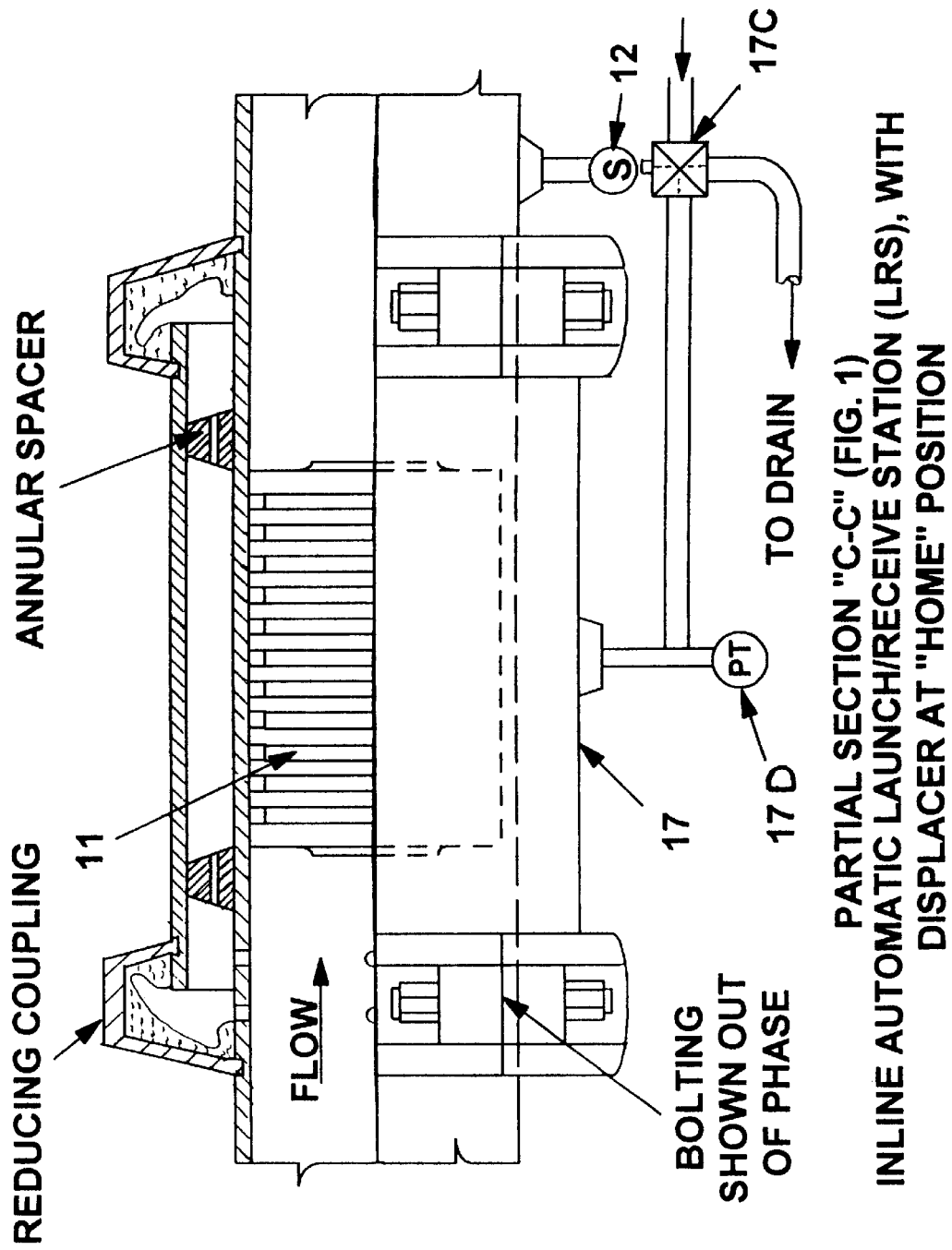

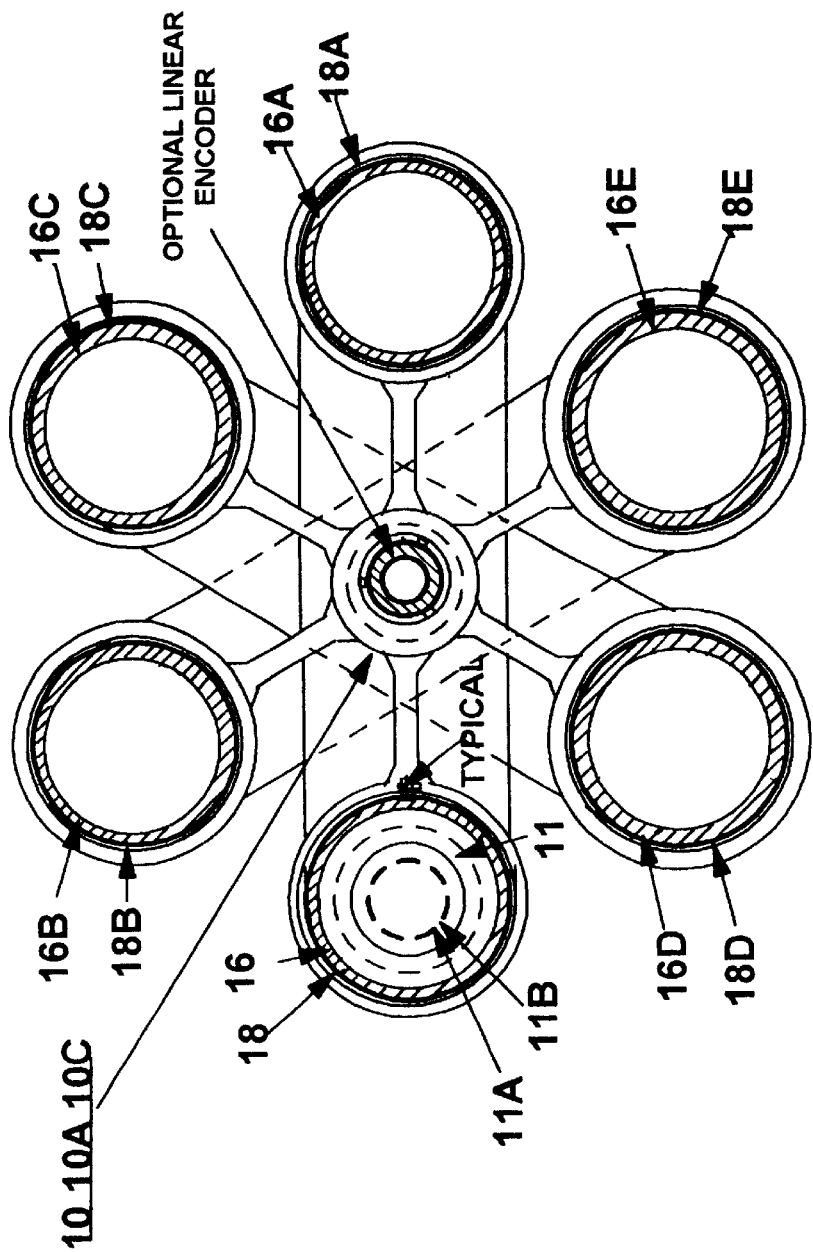

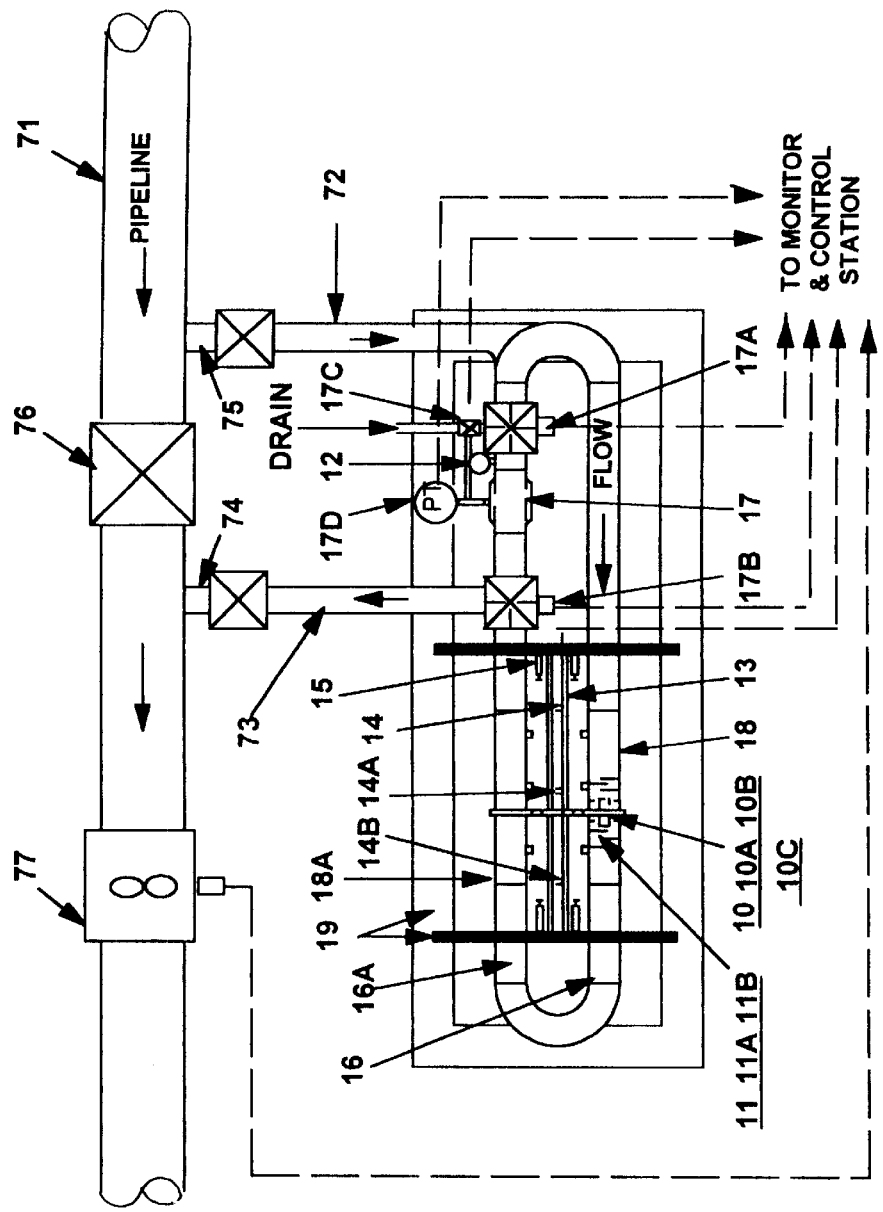

MACHINE AND PROCESS FOR THE CALIBRATION AND PROVING OF FLOW SENSORS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates generally to flow meter calibration and proving devices, and more specifically to a magnetically coupled, positive displacement, small volume, multi-axial, isokinetic, device that can be used as a flow calibrator or prover.

Flow calibrators or provers are used by metrology labs, flow sensor manufacturers, and field calibration operators. For users calibrating flow sensors requiring high accuracy, variable flow rates, extended flow turndowns, various calibrating fluids, and in some cases, fluctuating process conditions, the industry standard, positive displacement type calibrators/provers traditionally employed are: (1) The "sphere" calibrator/prover, often referred to as "ball" or "pipe" calibrator/provers, (2) The oscillating piston calibrator/prover, and (3) The "small volume" calibrator/prover (SVP). For custody transfer installations, these devices must provide an uncertainty of 1 part out of 10,000, as mandated in API Chapter 4, Manual of Petroleum Measurement Standards.

1) The "sphere" calibrator/prover typically uses over-inflated, spherical, elastomeric displacers, and requires large volumes of displaced calibration fluid per operation, due to the inherent repeatability inaccuracy of the mechanically activated, volume detector switches employed therein. They may be operated in a uni-, or bi-directional mode. They are typically constructed of commercial grade, carbon steel, pipe and fittings.

2) The oscillating piston type of calibrator/prover typically employs a solid metal, free floating piston, with "cup" seals, that oscillate between detector switches and is similar to the "sphere" type, in construction, and large volume displacement required.

3) The SVP type of calibrator/prover typically utilizes an internal metal poppet valve mounted in a precision machined steel piston, with special seals, oscillating in a plated, honed, precision machined, cylindrical flow tube. The piston is retracted upstream between calibration cycles by means of a pneumatic, hydraulic, or mechanical coupling of the piston shaft. The displaced volume of the SVP is a fraction of that for the "sphere" or oscillating piston types due to the use of precision volume detector switches, dual megahertz chronometers, and pulse interpolation of the test sensor's output. The requirements for the SVP, are defined in the API, Manual of Petroleum Measurement Standards, Chapters 4.3, and 4.6.

The moderate to high cost of "sphere", oscillating piston, and SVP type calibrator/provers, typically restricts the use of these devices to those users, and service contractors, involved in custody transfer of hydrocarbon liquids, manufacturers of large quantities of flow sensors, and commercial metrology facilities. Start/stop operation of the displacer is common to all of these devices. Other inherent disadvantages are:

1) "Sphere" and oscillating piston types require a large amount of dedicated, cubic operating space, and high volume storage tanks for calibrating fluids, in the calibration lab. Cost of ownership is considerable, including maintenance and periodical NIST traceable recertification. The use of various calibrating fluids is restricted by the materials of construction of the device. Due to large dispensed volumes required, multi-pass calibrations, which require start/stop of the displacer, and those performed at low flow rates can be extraordinarily lengthy.

2) SVP types achieve the industry mandated accuracy, with the use of precision electronics, pulse interpolation, and special proprietary seals, operating in a precision honed cylinder. The cylinder is typically centrifugally cast or forged. Care must be exercised to prevent these surfaces from corrosion and minute defects. Energy and time must be expended to retract the oscillating piston upstream, against the fluid flow, between calibration cycles. Another inherent disadvantage of the SVP, is the inability to accurately calibrate flow sensors with minimal or irregular pulse counts per unit of displaced volume, due to the small amount of displaced fluid per calibration cycle. Also, mass flow meters such as the coriolis type not only require larger amounts of displaced fluid per cycle, but are affected by the flow perturbations induced when the poppet valve closes to launch the piston downstream. When the SVP is equipped with the typical up and downstream volume switches, the dispensed volume represented by the spacing of these two switches must also be displaced through small flow sensors that could be calibrated with much less volume displaced. Cost of ownership is typically less than that for "sphere" types, but still considerable.

BRIEF SUMMARY OF THE INVENTION

A primary object of the present invention is to provide a magnetically coupled, small volume, positive displacement, fully automatic, flow sensor calibrator/prover.

Another object of the invention is to provide a high accuracy, economical calibrator/prover, with increased operating speed, that requires minimally dispensed calibration fluid, and a small operating space, without precision machined, proprietary components.

Yet another object of the invention is to perform single or multi-pass, calibration cycles by isokinetically dispensing increments of the composite volume displaced during a single, unidirectional transit of the displacer.

In accordance with a preferred embodiment of the present invention, 'The invention includes a single, or multiple serially connected, flow tube(s), the number of which determines the number of calibration cycles performed, with one unidirectional passage of a free floating displacer, from initiation to acquisition in an Inline Automatic Launch/Retrieve Station (LRS), means a discrete, pre-calibrated, displaced volume of calibration fluid for each flow tube, equating to spacing between Volume Detector Sensors (VDS), is isokinetically dispensed by the displacer through test meters(s), while simultaneously, the electronic outputs from the VDS, the test meter(s), and optional auxiliary instruments, are interpolated, and processed in the P.C. or PLC based operator Monitoring & Control Station(MCS), means a cylindrical, convoluted, magnetically coupled displacer, with anti-compression device(s), and imbedded magnet(s), which emits an omni-directional magnetic field, is sequentially coupled to, and decoupled from, a coaxial, or parallel, oscillating, Volume Detector Actuator (VDA), means the calibration fluid flow propels the displacer, in one direction, through a flow tube, then a return bend, and subsequently through the next flow tube, in the opposite direction, reacquiring the outer ring of the VDA, to initiate the calibration cycle for that flow tube, means each outer ring of the VDA, is located concentrically,or parallel, to a flow tube, and is connected to a common, circular center ring, simultaneously oscillating with the outer ring(s), and traversing coaxial to a centrally mounted Volume Detector Rod (VDR), said VDA center ring sequentially activates the VDS's, by means of a VDS Initiator, a projection integral to the VDA, and maintains dynamic concentricity by virtue of integral centering devices located in the VDA center ring.

The inclusion of a convoluted, cylindrical displacer in the apparatus, in lieu of the spherical type previously employed, allows the displacer to traverse pipeline tees, and standard, long radius elbows. The omni-directional imbedded magnet (s), enables the displacer to magnetically couple to, and decouple from, a coaxial, or parallel, oscillating, VDA. The convolutions of the displacer provide multiple, dynamic, seal surfaces, separated by liquid filled annular spaces, and eliminates inner poppet seals of the "small volume" piston type prover(SVP). This combination of elements eliminates the start/stop operation of previous designs, and provides multiple, sequential, calibration cycles, for multiple sensors, with a single, unidirectional, passage of the displacer, the number of calibration cycles defined by the number of serially connected flow tubes.

The apparatus can provide multiple calibration cycles during the continuous, unidirectional passage of the displacer, the number of cycles, and volume dispensed, defined by the number of coaxial, or parallel, serially connected, flow tubes, thereby eliminating flow perturbations. Multiple flow sensors can be calibrated, simultaneously, and flow rates can be constant or modulated. The operator can configure the dynamic flow rate control as required. For custody transfer proving operations, wherein the repeatability of the flow sensor is established, the apparatus provides the required multiple calibration cycles, without a start/stop oscillation of the displacer, with a single, continuous, unidirectional, isokinetically dispensing, passage of the displacer, from launch to retrieve.

Other objects and advantages will become apparent from the following descriptions, taken in connection with the accompanying drawings, wherein, by way of illustration and example, an embodiment of the present invention is disclosed.

BRIEF DESCRIPTION OF THE SEVERAL DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 5 is a longitudinal, quarter cross section of the Inline Automatic Displacer Launching/Receiving Station, with the displacer illustrated unsectioned, and located in the "Home" position, of the present invention.

FIG. 6 is a view similar to that of FIG. 2, showing a six-tube version, and an optional linear encoder, in accordance with an alternate embodiment of the present invention.

FIG. 7 is a plan view of a unidirectional two-tube, pipeline meter prover version, in accordance with an alternate embodiment of FIG. 1, of the present invention.

DETAILED DESCRIPTION OF THE PREFERRED EMBODIMENTS

Detailed descriptions of the preferred embodiments are provided herein. It is to be understood, however, that the present invention may be embodied in various forms. Various aspects of the invention may be inverted, or changed in reference to specific part shape and detail, part location, or part composition. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
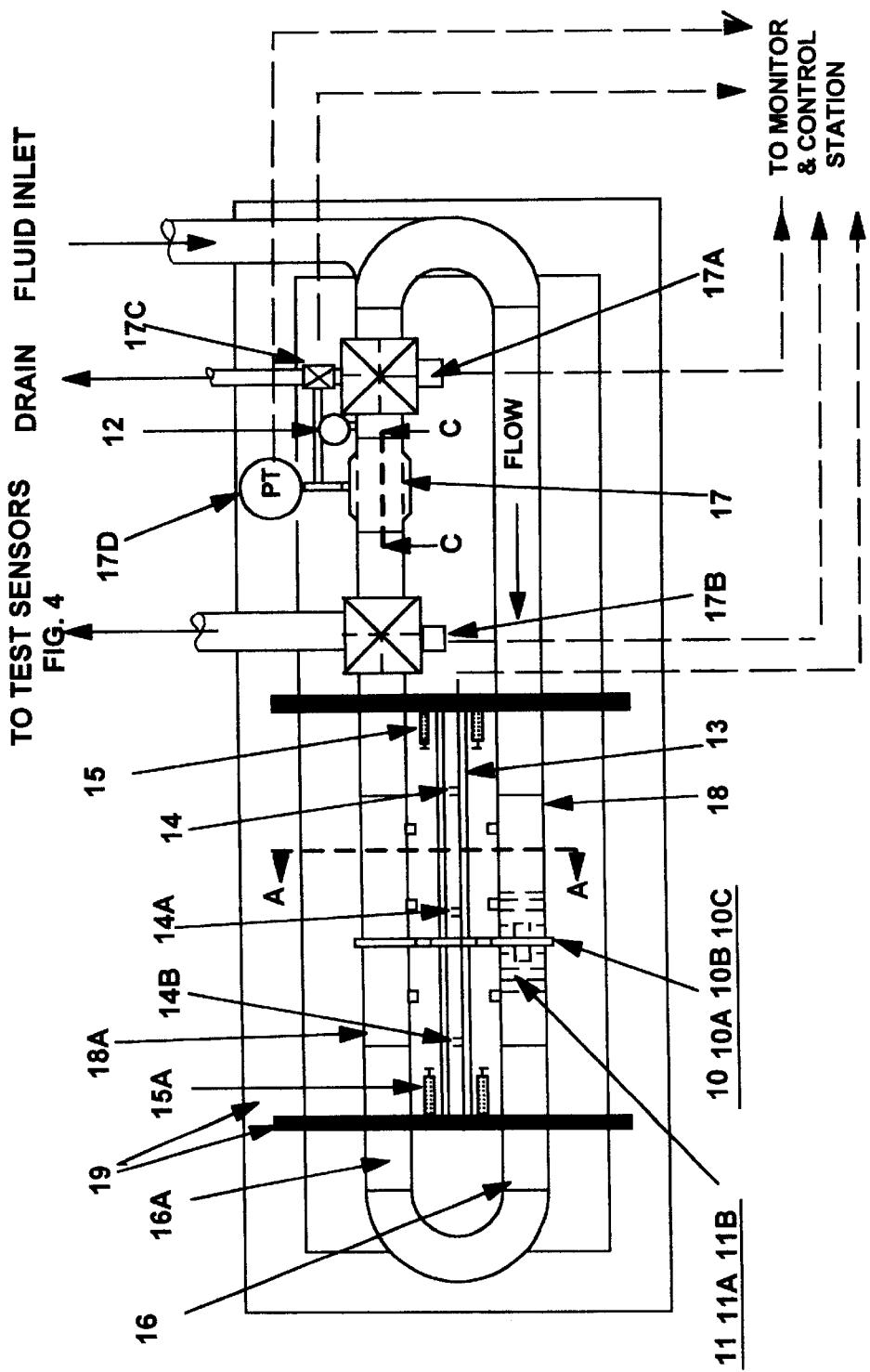
FIG. 1 is a plan view of a unidirectional, two-tube version of the calibrator/prover, in accordance with a preferred embodiment of the present invention.
Figure 2:
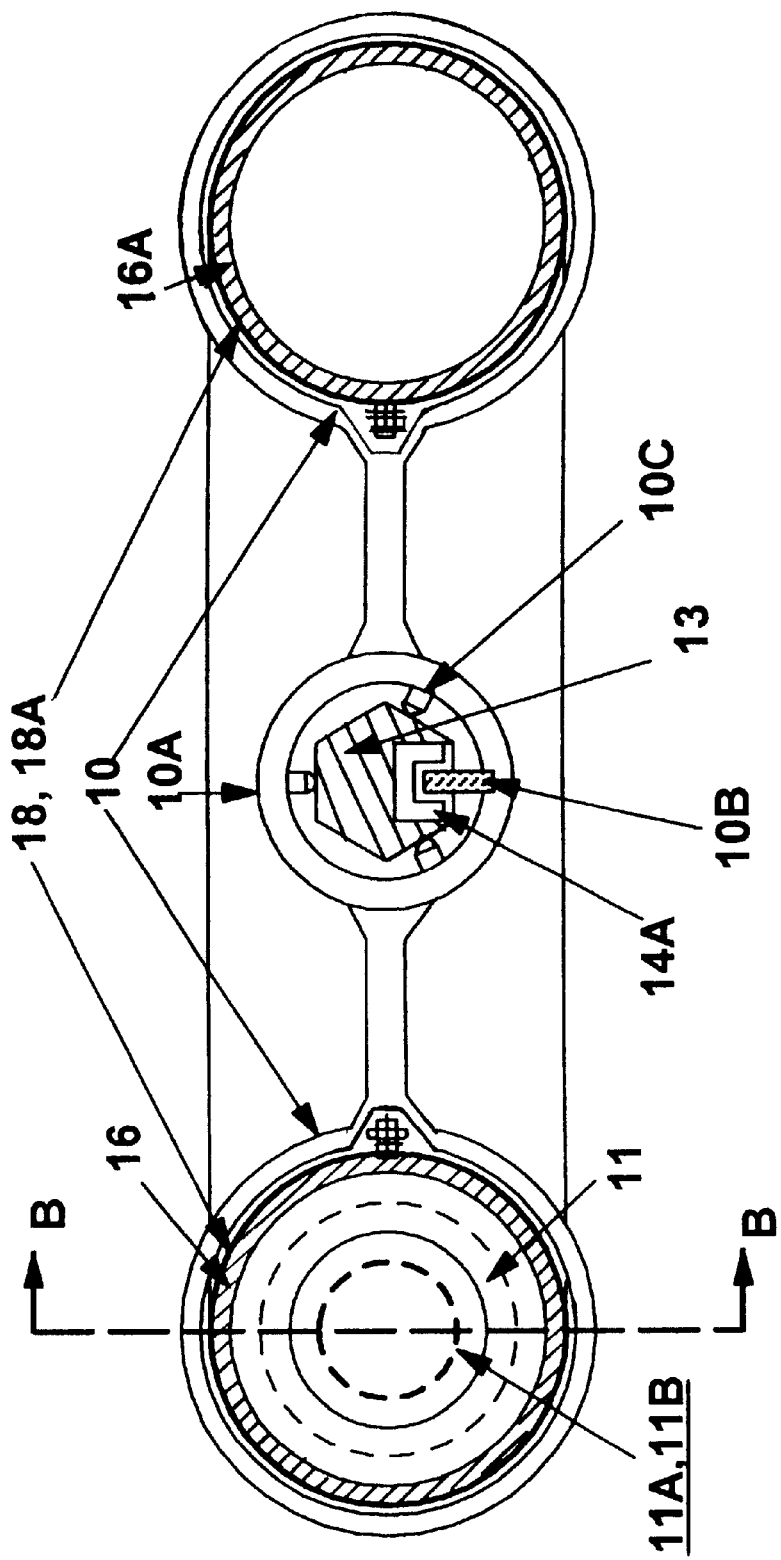
FIG. 2 is a cross sectional view taken along line A—A of FIG. 1.
Figure 3:
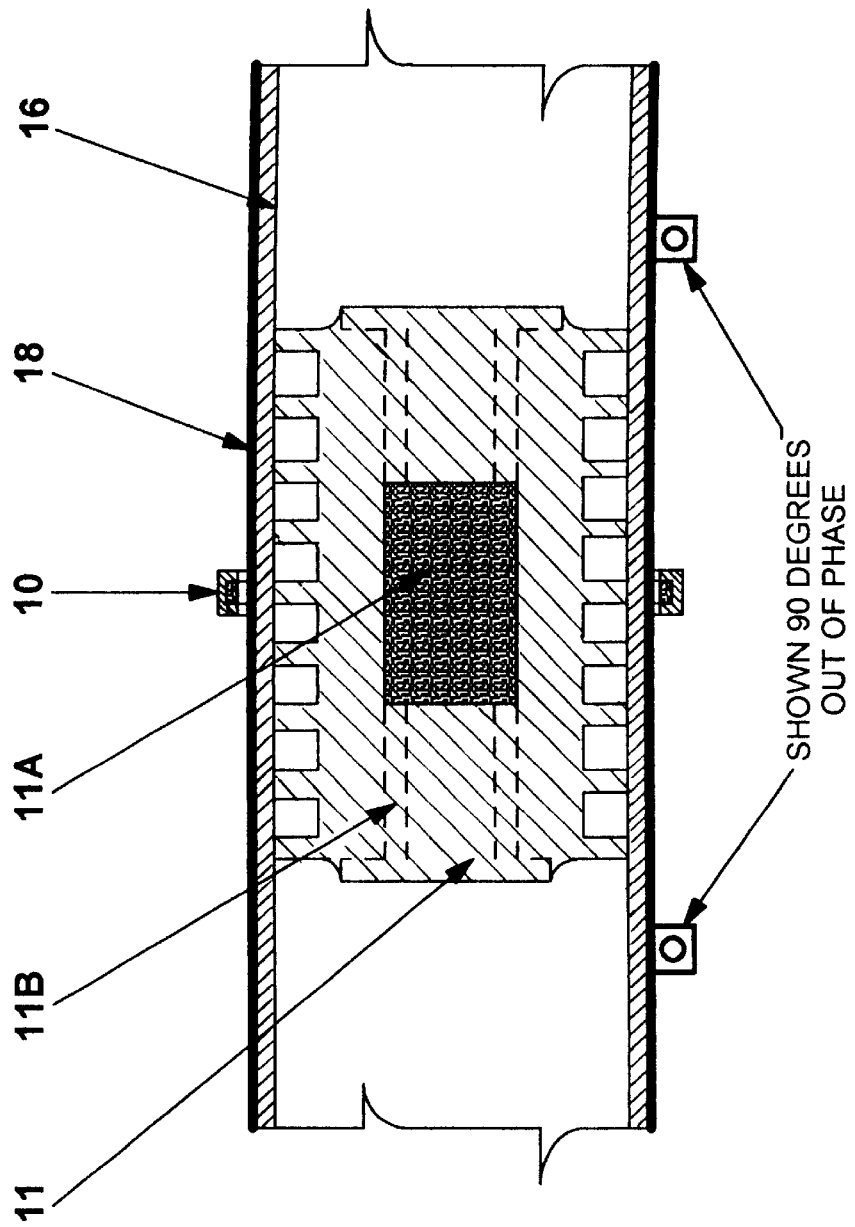
FIG. 3 is a cross sectional view taken along line B—B of FIG. 2 illustrating the flow tube, displacer, Volume Detector Actuator, and Anti-Compression Band.

Turning first to FIG. 1, there is shown a version of the preferred embodiment of the invention mounted on a stationary frame skid 19, with two flow tubes 16, 16A, each with Anti-expansion Band Devices 18, 18A. Prior to commissioning, the apparatus is calibrated, traceable to NIST, by establishing the exact volume dispensed by displacer 11, with imbedded magnet 11A, and anti-compression device 11B, in a section of each flow tube 16, 16A, said volume represented by the spacing between Volume Detector Sensors (VDS) 14, 14A, 14B. A base volume (Vb), thus dispensed for each flow tube, becomes a constant value in the calculations to establish the performance characteristics for the test flow sensor(s) as shown in FIG. 4–41, 4–42.

To describe the features of the apparatus, the following operational sequence details a typical calibration operation as observed by an operator technician.

Figure 4:
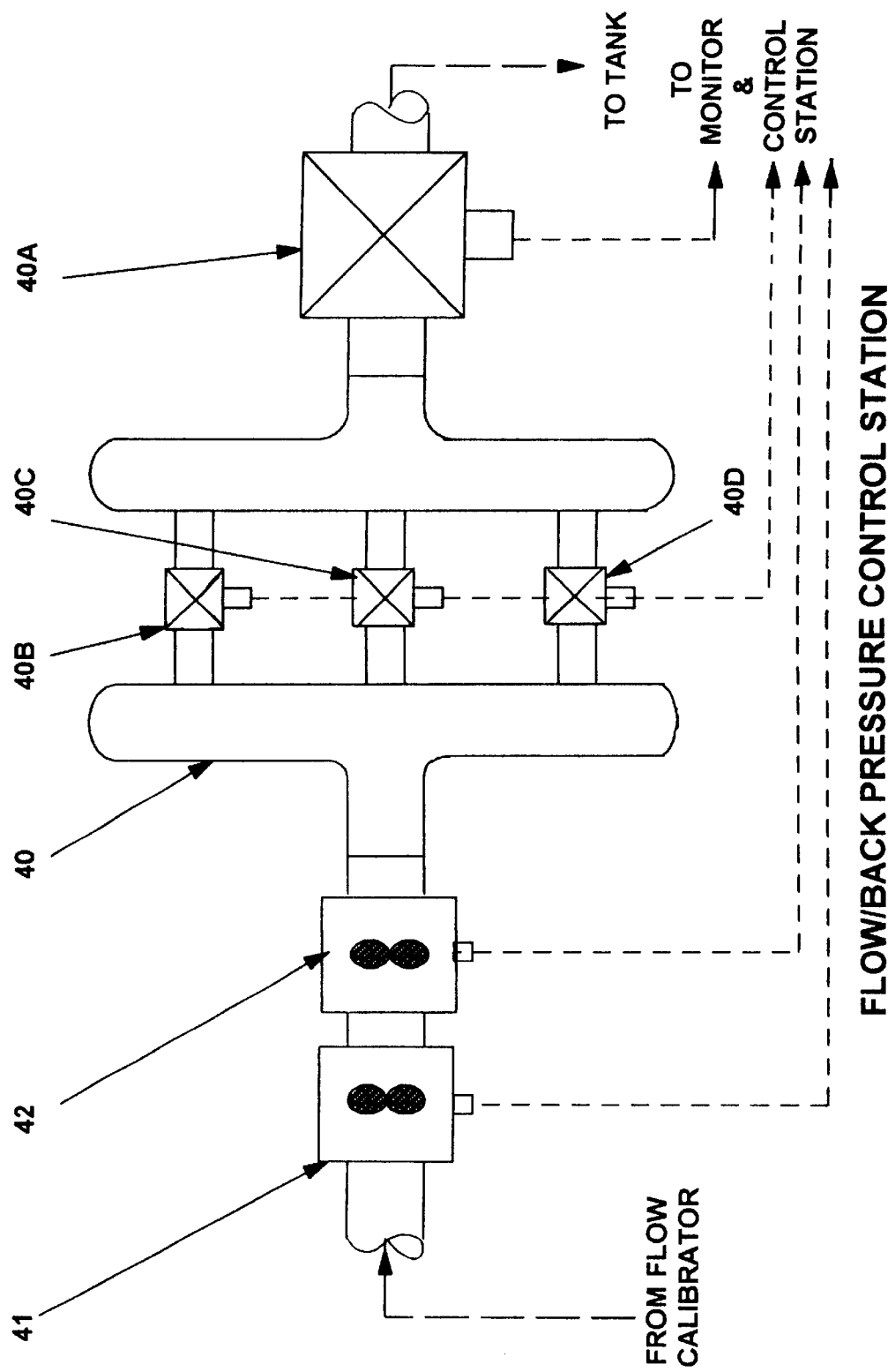
FIG. 4 is a plan view of the Flow/Back Pressure Control Station element of the calibrator/prover, as indicated in FIG. 1.

Pre-launch (Pre-run):
1. Launch/Receive Valves (LRV)17A, 17C, are normally closed. Launch/Receive Valve (LRV)17B, is positioned with discharge from last flow tube 16A, diverted to test flow sensor(s) 41, 42 as shown in FIG. 4, and flow closed to Inline Automatic Launch/Receive Station (LRS) 17. Primary and secondary flow control valves 40A–D, as illustrated in FIG. 4, are normally open to settings required for initial or constant flow rate, as configured by operator.
2. Displacer 11, is static and located at "Home" position in the LRS 17, of FIG. 5.
3. Test flow sensor(s) 41, 42, as detailed in FIG. 4, and any optional auxiliary instruments are installed, with electronic output cables connected to an operator Monito & Control Station (MCS), P.C./PLC, not shown, but commercially available.
4. The MCS P.C./PLC, is booted up, and desired configuration is entered in the calibration software, such as test sensor(s) data, constant or modulated flow rate parameters, type of calibration fluid, sensors signal scaling, preferred data presentation, static or dynamic seal integrity diagnostics, acceptable deviation and abort parameters, etc.
5. Calibration fluid pump is started, and flow is introduced into the calibrator at the tangential pump/tank fluid inlet.

6. The operator initiates flow settings for primary and secondary flow control valves, such as constant flow rate, or modulating flow rate, increasing or decreasing, with increments to be linear, logarithmic, repeat at maximum or minimum flow, etc.

7. If selected, the operator performs static seal integrity test by monitoring pressure changes in the LRS 17, with sensor 17D, occurring at the up and downstream side of displacer 11.

8. Upon verification of satisfactory pre-launch parameters, the operator initiates automatic launch or "run" sequence.

Launch (Run):

9. LRV 17A, and 17C, are sequenced by computer for launch/run mode. LRV 17A is opened to LRS 17, and LRV 17C, diverts pump discharge pressure to LRS 17. Displacer 11, is propelled by differential pressure produced in the LRS 17, through LRV 17A, to tangential pump inlet junction, wherein annular convolution spaces are filled with fluid as displacer 11, passes through pump discharge flow and displacer 11, achieves constant velocity as it is propelled downstream.

10. LRV 17A, and 17C, are reset by the computer to run/receive mode. LRV 17A, is closed to LRS 17, and LRV 17C, is positioned for static/dynamic seal integrity monitoring, or to drain, depending upon operator selection.

11. Displacer 11, having achieved constant velocity, next magnetically couples to the Volume Detector Actuator (VDA) 10, with integral center ring 10A, initiator 10B, and centering devices 10C, at first Coupling/Decoupling Station 15. Displacer 11, transits downstream through flow tube 16, closely coupled to VDA 10, at constant velocity. To insure magnetic coupling integrity during each calibration cycle/pass, a constant velocity calculation is dynamically performed by the MCS P.C./PLC.

12. VDA 10, closely coupled to displacer 11, next encounters and activates the first Volume Detector Sensor (VDS) 14, located in the Volume Detector Rod (VDR) 13, then sequentially each of the remaining VDS 14A, 14B. Simultaneously, the displacer 11, isokinetically dispenses a known volume of calibration fluid for flow tube 16, represented by spacing between the VDS 14, 14A, 14B, through the test flow sensor(s) 41, 42, FIG. 4, performing a calibration cycle or pass. Electronic outputs from each VDS are sequentially transmitted to the MCS, P.C./PLC, simultaneously with output(s) from test sensor(s) 41, 42, FIG. 4, and other optional auxiliary instruments.

13. VDA 10, next engages alternate Coupling/Decoupling Station 15A, and undergoes constant linear deceleration to complete arrest, at which time the displacer 11, decouples and completely disengages from the VDA 10, and continues flowing downstream.

14. The displacer 11, transits through an 1800 return bend and proceeds to re-engage the static VDA 10, at Coupling/Decoupling Station 15A, to perform the next calibration cycle/pass for flow tube 16A, and repeats the above sequence, in reverse, continuing downstream. Displacer 11, maintains constant velocity during calibrated volume dispensed for each flow tube 16, 16A, and for subsequent calibration cycles/passes. The test flow sensor(s) 41, 42, FIG. 4, have not been subjected to abrupt flow perturbations, but rather a smooth continuous flow is present during the calibration operation, during which, multiple calibration cycles/passes are performed.

15. Subsequent to the last calibration cycle/pass, for flow tube 16A, Launch/Receive valve 17B is cycled open to allow displacer 11, to pass through and return to the "Home" location in the LRS 17. LRV 17C, is sequenced to open to drain, then cycled closed, when displacer 11, activates signal from locator switch 12, for "Home" position.

16. The data, which has been dynamically assimilated in a calibration software program during each sequential cycle/pass, is combined with pre-entered base volume constant Vb, and others, to calculate performance characteristics of test sensor(s), 41, 42, FIG. 4.

17. All data acquired during calibration is compiled in a software data file, and can be displayed for review by an operator for subsequent calibration report certificate generation and/or graphing or plotting. Pressure & temperature sensor outputs, or constants, may also be included in the calculations. In addition to processing outputs from the test flow sensor(s) 41, 42, FIG. 4, multi-megahertz clocks (timer/counters), internal to the MCS P.C./PLC, calculate precise event pulses, and elapsed time between selected intervals of the VDS 14, 14A, 14B, outputs. Dynamic constant velocity calculations are performed during each calibration cycle/pass, to insure magnetic coupling integrity, during the calibrated volume displacement. The operator, during initial configuration, can select acceptable deviation values, and alarm/abort options.

18. Optional Anti-Expansion Bands 18, 18A, mechanically pre-stress the wall sections of flow tubes 16, 16A. Potential change in calibrated base volume Vb, due to process changes, are offset by the compressive stresses induced by the Anti-Expansion Bands 18, 18A. The alternative is for the software to calculate the corrections based on pressure and temperature sensor inputs.

19. When the apparatus is utilized as a pipeline flow meter "prover" in the field, as shown in FIG. 7, the basic operation and components remain the same as above, and as illustrated in FIG. 1, except that the inlet 72, and outlet 73, of the apparatus is typically connected to "prover taps" 74, 75, on the pipeline 71. The pipeline flow is diverted by valve 76, through the apparatus, and subsequently through the test flow sensor 77. The flow rate is typically constant, the selection and operation of installed components conform to custody transfer industry standards, and to the specifics of the installation.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A magnetically coupled, small volume, positive displacement, multi-axial, isokinetic, fully automatic flow sensor calibrator/prover device comprising: a series of multiple interconnected cylindrical flow tubes arranged radially around a volume detector rod that houses a series of volume detector sensors; a magnetically coupled volume detector actuator device with outer elements oscillating coaxially to each flow tube, said outer elements connected to an inner, common, center element with an integral volume detector sensor initiator element, and dynamic centering elements, which said inner, common, center element oscillates coaxially with the volume detector rod; the series of volume detector sensors located in the volume detector rod and activated sequentially by the volume detector sensor initiator element, the spacing between said sensors defines a pre-calibrated, incremental displaced volume amount of calibration fluid in a section of each flow tube, and a comparison of elapsed time between two or more of said sensors during a calibration cycle/pass is integral to monitoring for magnetic coupling integrity; a cylindrical, convoluted, magnetically coupled displacer with imbedded magnet(s) and anti-compression spring(s), the displacer emitting an omni-directional magnetic field, said displacer flowing freely inside the flow tubes, said displacer propelled at a constant velocity by an introduction of calibration fluid flow, while the displacer sequentially, isokinetically, dispenses the pre-calibrated, incremental displaced volume amount of calibration fluid through one or more test flow sensor(s), while said displacer is in continuous unidirectional transit from, and to, an inline automatic launching/receiving station.

2. A flow sensor calibrator/prover device as claimed in claim 1, wherein the sequential, isokinetically, dispensing of said pre-calibrated, incremental displaced volume amount of calibration fluid through the test flow sensor(s) occurs during said elapsed time between two or more of said volume detector sensors during a calibration cycle/pass, while determining the performance characteristics of said test flow sensor(s).

3. A flow sensor calibrator/prover device as claimed in claim 1, further comprising: an anti-expansion band device which encompasses said section of each flow tube, said anti-expansion band device inducing compressive stresses in a wall of said section of each flow tube, thereby preventing expansion of said section of each flow tube during a calibration operation, due to fluctuations in process conditions.

4. A flow sensor calibrator/prover device as claimed in claim 1, further comprising: opposing, self compensating, linear decelerating, coupling/decoupling stations selected to engage and subsequently arrest, the volume detector actuator device in a linear decelerating manner and position said volume detector actuator device for subsequent reacquisition by the displacer.

5. A flow sensor calibrator/prover device as claimed in claim 1 wherein the volume detector sensors are selected from the group consisting of laser, magnetically actuated, ultrasonic, L.E.D., photoelectric, or hall effect, type sensors.

6. A flow sensor calibrator/prover device as claimed in claim 1, wherein said inline automatic launching/receiving station is comprised of a home element, which receives and launches the displacer, with appropriate launch/receive valves and control components, said inline automatic launching/receiving station provides access for inspection or replacement of displacer, said inline automatic launching/receiving station provides dynamic or static seal integrity monitoring of the launch/receive valves, as selected by the operator.

7. A flow sensor calibrator/prover device as claimed in claim 1, further comprising an automatic flowback pressure control station, comprised of primary and secondary control valves, which enables operator to select initial system calibration fluid flow rate, and provides automatic, instantaneous, incremental calibration fluid flow rate modulation, if selected, and constant system back pressure, for each calibration cycle/pass.

8. A flow sensor calibrator/prover device as claim 1, further comprising an operator monitoring and control station, with calibration software, commercially available personal computer, and/or programmable logic controller, and appropriate signal conditioning I/O hardware, said operator monitoring and control station combines inputs from the volume detector sensors, test flow sensor(s), and other optional electronics, for determining performance characteristics of the test flow sensor(s), and dynamic constant velocity calculations.

* * * * *